Patented Sept. 20, 1932

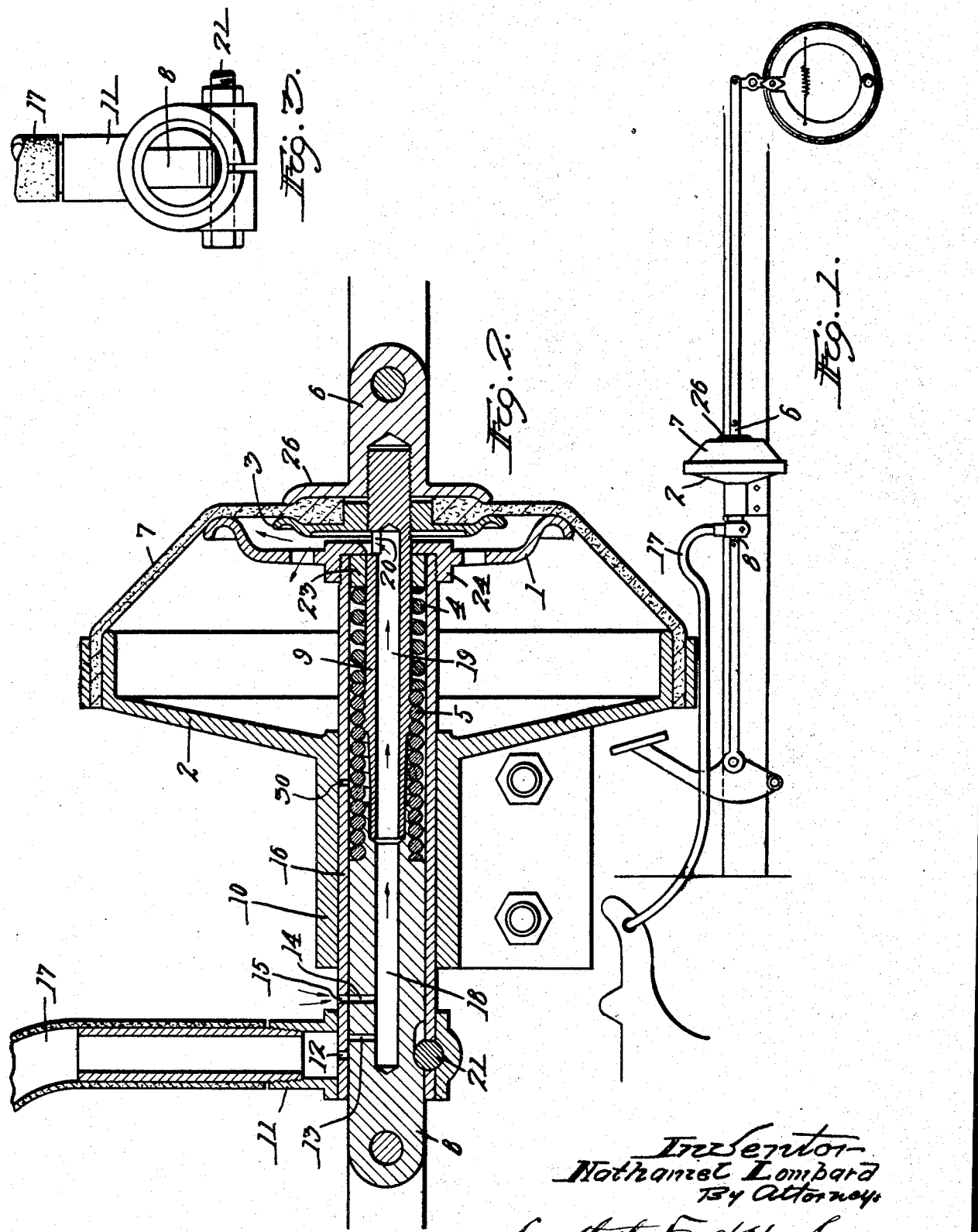

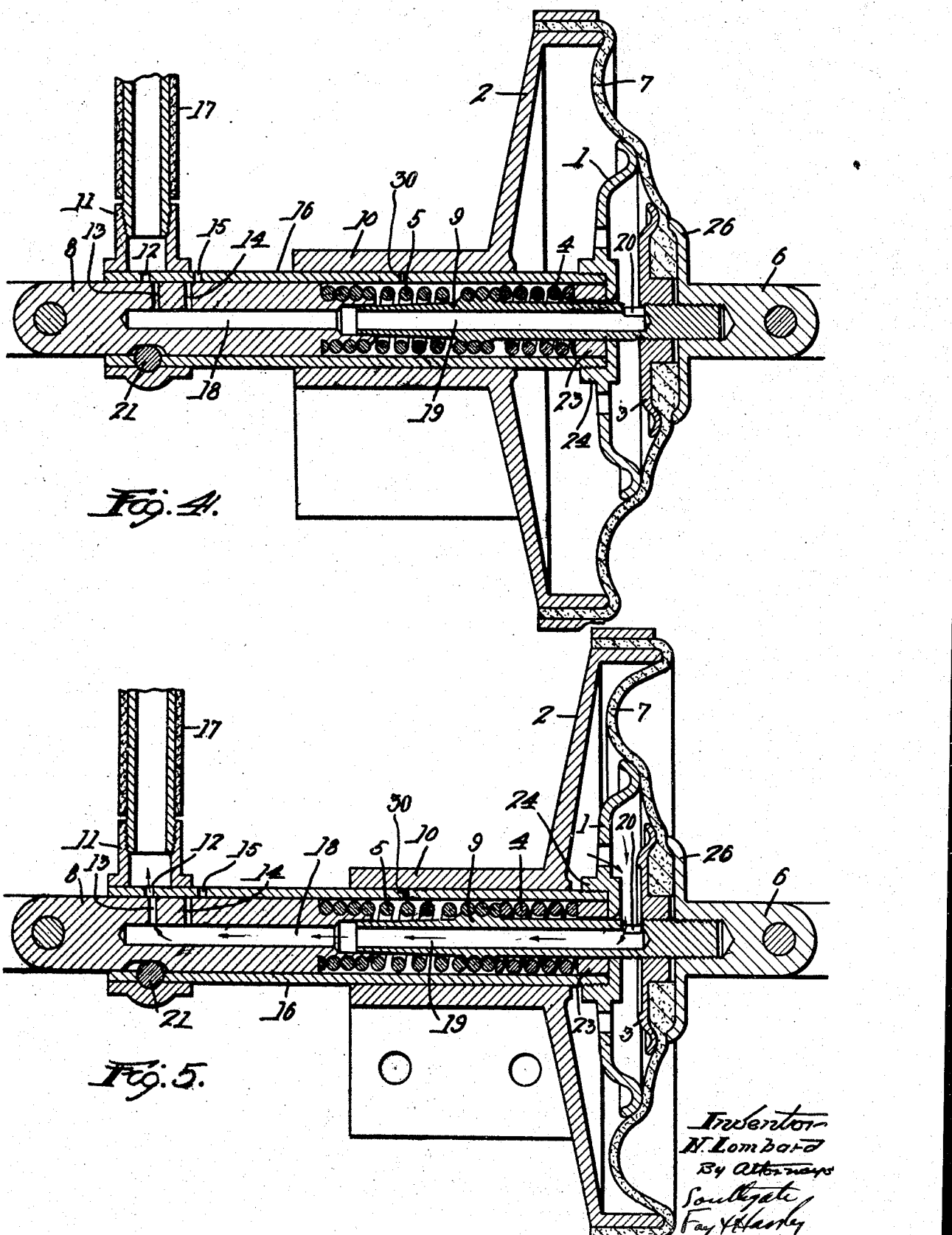

1,878,786

UNITED STATES PATENT OFFICE

NATHANIEL LOMBARD, OF WORCESTER, MASSACHUSETTS

POWER BRAKE

Application filed February 9, 1929, Serial No. 338,855. Renewed September 24, 1931.

The objects of this invention are to provide, in a cheap, reliable and practical manner, manual and power means for setting the brakes on a moving car, a resistance to the movement of the foot lever which is much less than, but proportional to, the application of power to the brake rod and means for overcoming the tendency of power-operated brakes to give sudden and startling braking effects with but slight movements of the brake lever.

Reference is to be had to the accompanying drawings in which

Fig. 1 is a side view showing how the brake is connected up;

Fig. 2 is a diametrical sectional view of a preferred embodiment of the invention, showing it in normal inactive position;

Fig. 3 is an end view;

Fig. 4 is a view like Fig. 1, but in the act of applying the brake initially, and Fig. 5 is a similar view, showing the extreme position of the parts.

This brake-applying power means consists, essentially, of a flexible diaphragm covering one side of a casing, the space between being connected at will to the intake manifold of a revolving internal combustion engine or to the air. The diaphragm actuates a flange mounted on one end of a valve sleeve, which sleeve fits and slides in the hub of the diaphragm's casing and is operatively connected with a compound link which fits and slides in the said valve sleeve and constitutes a part of the mechanical connection between a foot pedal or other brake applying means and brake rigging.

The compound link has three parts. Part one is a round rod 8 having an eye for a pin connection at its left-hand or pedal end, a port 18 bored axially from its right-hand or brake end and extending nearly through it, and two lateral cross cuts, or ports, 13 and 14, through its side. Part two is a round rod 9, having an eye piece 6 screwed on its right-hand end and constituting also one of a pair 3 and 26 of gripping flanges for securing the flexible diaphragm 7 by its center to said rod, the rod having a hole 19 bored axially into it from its pedal end to said flanges and having a lateral port 20 cut into it at flange 3. This right-hand link-rod 9 is extended to the left and turned to enter, fit and slide in a short recess in the brake end of link-rod 8, thereby forming a continuous port through the link and also steadying that end of the rod. Part three is a stiff coiled steel spring 5 which unites the two rods 8 and 9 by attachment thereto and is normally neither extended nor compressed. The preferable method of attachment of the spring to the rods is to screw the spring tightly on a threaded portion of each rod, the thread sections being shaped to fit the coils. The rod 8 has its threaded portion on its right-hand end while the rod 9 has its threaded portion near the middle of its length. The arrangement leaves several coils between these two threaded portions unengaged by either thread and capable of action as a tension spring.

This compound link fits into and slides in a long sleeve 16 extending from a point close to the flange 3 to a point close to the left-hand end of the link 8, and carrying on the former end a flange 1. This sleeve 16 itself fits into and slides in a shorter sleeve 10 fixed in position by firm attachment to the car body. The shorter sleeve 10 carries integral with it at its brake end a diaphragm casing 2, to the outer rim of which is secured the corresponding moulded rim of a flexible diaphragm 7, the center of the diaphragm being pierced by a hole, the edge of which is preferably thickened so as to be readily gripped between the aforesaid flanges 3 and 26.

The brake end of the long sleeve 16 is threaded into a boss 24 centrally located on a perforated diaphragm flange 1. The perforations in said flange permit air to flow freely between its two sides. The central part of this flange has a hole large enough for the link member 9 to slide through and the annular part of the flange surrounding the hole acts as an abutment for a ferrule 23 carried on the link member 9, and which is pressed upon by a powerful helical spring 4. This spring surrounds the hollow part of the link member 9 and exerts pressure on the brake end of the tension spring member 5 of the compound link. The link-rod 9 fits and slides freely in the ferrule 23.

The left-hand end of the long sleeve 16 carries, firmly attached to it, a small casing 11 which has a two-fold object. It provides a place for a key bolt 21, by means of which the brakes may be set by the mere pull of the pedal on the compound link in the usual way, should the car be moving while the engine is not rotating and hence not producing suction. In order that the engine vacuum may be connected or disconnected with the inside of the compound link, play enough is allowed in the fit of the key bolt in the left-hand link-rod 8 to permit sufficient motion of the said rod 8 relative to the position of the sleeve 16 to allow of connecting the ports 13 and 12 or ports 14 and 15; and the casing 11 also serves as the terminal chamber of a flexible tube 17 connecting the inside of the link with the intake manifold of the engine through a lateral port 12, cut through the casing-enveloped end of the sleeve 16 and situated slightly to the left of the link port 13.

The key bolt is put there merely to make sure of the connection between the foot and the brakes in the case of absence of vacuum; but the spring is really and practically sufficient, although, of course, not so absolutely certain not to break. The bolt is insurance which costs nothing since such a bolt must be used to pinch the casing 11 so as to hold it by friction firmly in place on the end of the casing.

To attach the device to a car, a section of the pedal brake rod is cut out and eye-bolt stud-ends are screwed to the two cut ends, the distance apart of their pin centers when the pedal is raised being equal to that between the eyes at each end of the unextended compound link. The compound link having been fastened by pins to the said stub ends, the casing 2 is fastened to the bar body in such a position that its axis is on the original axis of the brake rod and its flexible diaphragm 7 is fully extended to the left, as shown in Fig. 1, but not so fully as to interfere with the necessary degree of slack in the brake rigging required to permit free running of the car, which slack is maintained by the brake retractile springs always provided in brakes for that purpose.

The spring 5 is located in the space between the sleeve 16 and the two members 8 and 9 of the brake rod link. The interstices of this space preferably are filled with lubricating grease, which may pass through a vent port 30 into the comparatively loose bearing 10.

The operation of the power means when connected by flexible tubing to the engine intake will be as follows: Starting with the parts in the position shown in Figs. 1 and 2, the first slight depression of the pedal moves the entire compound link to the left, without change in its overall length, until the resistance offered by the brake rigging stops further movement of the right-hand link-rod member 9. This brings the port 14 out of communication with the port 15.

Increased depression of the pedal puts a pull on the brake rigging by extending the spring 5 and also moves the left-hand link-rod 8 relatively to the long sleeve 16, held still by the compression spring 4, the slight distance necessary to connect ports 12 and 13. The connection of these ports permits the air in the space between the flexible diaphragm 7 and its casing 2 to lower its pressure by expansion out of the casing and into the engine through irregularities in the surface of the flange 3, the port 20 in the right-hand link-member 9, the long central holes 19 and 18, the ports 13 and 12 and the flexible tube 17. The external atmospheric pressure on the diaphragm 7 then forces the diaphragm flange 1 towards the pedal, compressing the right-hand spring 4 and putting thereby a pull on the brake rigging additional to that of the foot. At the same time, provided the brake lever is then held stationary, the long sleeve 16, to the right-hand end of which the diaphragm flange 1 is attached, is moved to the left until, by moving the port 12 past the port 13, it again cuts off the port connection between the engine suction and the inside of the link rods and thus, by preventing further expansion of the air contained in the space between the diaphragm and its casing, prevents temporarily any increase in braking effect. The pull on the brake rigging is also increased by the unbalanced air pressure acting directly on the flange 26. When the brake rigging has had its slack motion taken out of it by the initial depressions of the pedal, it is held stationary against more pedal motion and imparts its immobility to the brake end of the tension spring 5; for the spring 5 is attached to the right-hand link rod 9 which is itself a part of the brake rigging. This position is shown in Fig. 4.

As soon, therefore, as the two ports 12 and 13 are reconnected by additional pedal depression, such pedal depression must be accompanied by an extension and increased resistance of the spring 5, as well as by the resulting increased pressure of the outside air on the diaphragm with its accompanying increased braking effect. The extreme position which may be reached and which puts the heaviest pressure both on the brake and on the foot, is shown in Fig. 5.

It is thus apparent that the tension on the tension-spring 5, controlled by the operator and varying as it does its reaction on his foot proportionally to the variation in the total forces acting on the brake rigging, affords him a realizing indication of the amount of braking force being exerted by any given depression of the pedal. The outstanding peculiarity of this invention is, however, more than this for it provides a power brake mechanism wherein both the foot and the power means not only cooperate but both may continue to move, and produce thereby increased braking effect, after the brake rigging has had its slack motion absorbed and come substantially to rest. The especial advantage of this result of the combination is that the brakes may be applied gently and smoothly with far less skill and fatigue on the part of the operator than is the case in those power means wherein the foot abruptly stops moving if the brake rigging stops moving, and foot pressure alone, without much of any foot movement, has to be relied upon to produce any further braking effects.

The brakes are released in the usual way, the removal of the foot pressure allowing the rods for operating the brakes and the usual springs forming part of the brakes to move the rod 9 of the compound link-rod to the right. This motion acts through the spring 5 to move the rod 8 to the right, thereby aligning the port 14 with the air port 15 in the position shown in Fig. 1. The air port 15 is cut through the sleeve 16 to the outer air and is situated between the small casing 11 and the end of the diaphragm casing sleeve 10. It permits the outer air to re-enter the interior of the casing 9 and thus balance the atmospheric pressure on the diaphragm 7. The compression spring 4 is preferably wound with sufficiently open coils to permit the diaphragm flange to move nearly up to the casing under the conditions of the relative motions of the two sleeves 16 and 10 before the coils are compressed against each other; and the spring, when so compressed, should be sufficiently powerful to fully operate the brakes, aided, as it is, by the extension of the left-hand spring by the foot. It should be observed that the total possible motion of the diaphragm flange 1 towards its casing is much greater than the sum of the spaces between the compression spring coils, since the left abutment of this spring itself has motion to the left. If the vacuum in the engine is non-existent the brakes may be manually operated with practically no resistance from the power means.

Although I have illustrated and described only one form of the invention, I am aware of the fact that modifications can be made therein by any person skilled in the art without departing from the scope of the invention as expressed in the claims. Therefore, I do not wish to be limited in this respect, but what I do claim is:—

1. In a brake applying device, the combination of a casing and a flexible diaphragm connected therewith and forming an enclosed space with one side thereof, of means for connecting said space at will with an internal combustion engine intake manifold, a valve sleeve having a flange in position to be actuated by the diaphragm when said space is under reduced pressure, said casing having a perforated hub in which said sleeve fits and slides, and a compound link fitting and sliding in said sleeve, operatively connected thereto, and constituting an extensible mechanical connection.

2. In a brake applying device, the combination with a brake rigging and an operating lever, of a yieldingly extensible compound link connecting them, means whereby the first slight movement of the lever in a direction to apply the brake moves the compound link without extending it until the resistance offered by the brake rigging stops it, means whereby further motion of the lever in the same direction extends the link and puts a pull on the brake rigging and also moves the end thereof nearest the lever, said end of the link having a port, which by said motion opens communication to a source of reduced pressure and a flexible diaphragm having a space on one side, said link having a passage from the port to said space, whereby the external air on the other side of the diaphragm will move it, and means for transmitting the motion of the diaphragm to the brake rigging.

3. In a brake operating device, the combination with an operating pedal and brake rigging, of a compound link connecting them, said link comprising two members in alignment having a continuous longitudinal passage therein and relatively movable and an extensible spring tending to hold them together, a flexible diaphragm open to the air on one side and connected with the passage through said compound link on the other, and means whereby the force of the diaphragm when the air is partly exhausted from one side of it will move one member of the compound link toward the pedal, one member of the link having a port adapted to be connected with a source of reduced air pressure when the pedal is depressed.

4. In a brake operating device, the combination with an operating pedal and brake rigging, of a compound link connecting them, said link comprising two members having a continuous longitudinal passage therein and relatively movable and an extensible spring tending to hold them together, a sleeve in which the three parts of the compound link are contained, a flexible diaphragm open to the air on one side and connected with the passage through said compound link on the other, and means whereby the force of the diaphragm when the air is partly exhausted from one side of it will be applied to said sleeve to move it bodily, the sleeve and one member of the link having ports connected with the source of reduced air pressure and adapted to come into registration when the pedal is depressed.

5. In a brake operating device, the combination with a foot pedal and the brake rigging, of two link members relatively movable and connecting said pedal and brake rigging, said link members having a longitudinal air passage through them, one member of the link having a port which will connect the interior passage with a source of reduced air pressure and a venting port, yielding means for resisting the separation of the two parts of the link, a diaphragm having its center connected positively with the brake rigging and its outer rim in fixed position, one side of the diaphragm being open to the air and a fixed chamber on the other side, ports for connecting the chamber with said interior passage, and means adapted to be engaged by the diaphragm for pushing one member of the compound link toward the pedal when this chamber is connected with the source of reduced air pressure.

6. In a brake operating device, the combination with a foot pedal and a brake rigging of a compound link connecting them, said link comprising two relatively movable members and having a longitudinal air passage through them, and an extensible spring secured to said two members and normally tending to hold them together but capable of yielding, a sleeve in which the compound link is located, a diaphragm, one side of which is open to the air and a fixed chamber on the other side, one of the members of the compound link having ports for connecting the chamber with the source of reduced air pressure, whereby the diaphragm will move in a direction to reduce the contents of said chamber and means adapted to be engaged by the diaphragm for pushing the sleeve and one member of the compound link toward the pedal when this chamber is connected with the source of reduced air pressure.

7. In a brake operating device, the combination of a movable sleeve, a flexible connection from the intake manifold of an internal combustion engine fixed to said sleeve, said sleeve having a port communicating with the flexible connection, a compound link connected with the sleeve comprising two members, one having a port adapted to communicate with the first named port according to the position of the parts, the other telescoping therewith and having a port beyond the end of the sleeve, a contractible spring connecting the two parts together and normally tending to urge them into close contact, a diaphragm connected with the second mentioned member of the compound link, a diaphragm flange connected with the sleeve against which the diaphragm can move with a certain pressure toward the sleeve, whereby when the first two mentioned ports are in registration the air will be exhausted from one side of the diaphragm and the sleeve and one member of the compound link will be forced toward the pedal.

8. In a brake operating device, the combination of a stationary bracket having a cylindrical passage therethrough, a sleeve movable in said passage, a flexible connection from the intake manifold of a combustion engine fixed to said sleeve, said sleeve having a port communicating with the flexible connection, two link members, one having a port adapted to communicate with the first named port according to the position of the parts, the other having a port, a contractible spring connecting the two parts together, a compression spring connected with said sleeve for transmitting pressure to one member of the link, the latter spring being so wound that the coils do not come together to constitute a stop until the end of its travel, a diaphragm connected with the second link member, a diaphragm flange connected with the sleeve against which the diaphragm can move whereby when the first two mentioned ports are in registration the air will be exhausted from one side of the diaphragm and the sleeve and one member of the compound link will be forced toward the pedal.

9. In a brake operating device, the combination with a foot pedal, a brake rigging and a compound flexible link connecting them, of a sleeve movably mounted with respect to the link, a diaphragm casing provided with a cylindrical flange, a flexible diaphragm provided with a cylindrical portion secured to said flange, an eye piece slidably connected with said link and having a pair of flanges between which the open center of the diaphragm is secured and a diaphragm flange mounted on the end of said link and in position to engage the diaphragm beyond the circumference of the two flanges on the eye piece for the purpose described.

10. In a brake operating device, the combination with an operating pedal and brake rigging, of a compound link connecting them, said link comprising two members in alignment having a continuous longitudinal passage therein and relatively movable and an extensible spring tending to hold them together, a flexible diaphragm open to the air on one side and connected with the passage through said compound link on the other, means controlled by the pedal for connecting the passage in said compound link with a source of reduced air pressure and means whereby the force of the diaphragm when the air is partly exhausted from one side of it will move one member of the compound link toward the pedal.

In testimony whereof I have hereunto affixed my signature.

NATHANIEL LOMBARD.